US011399100B2

(12) United States Patent
Sun et al.

(10) Patent No.: US 11,399,100 B2
(45) Date of Patent: *Jul. 26, 2022

(54) FULL-DUPLEX ADAPTIVE ECHO CANCELLATION IN A CONFERENCE ENDPOINT

(71) Applicant: Cisco Technology, Inc., San Jose, CA (US)

(72) Inventors: Haohai Sun, Sandvika (NO); Johan Ludvig Nielsen, Oslo (NO)

(73) Assignee: CISCO TECHNOLOGY, INC., San Jose, CA (US)

(*) Notice: Subject to any disclaimer, the term of this patent is extended or adjusted under 35 U.S.C. 154(b) by 483 days.

This patent is subject to a terminal disclaimer.

(21) Appl. No.: 16/456,789

(22) Filed: Jun. 28, 2019

(65) Prior Publication Data

US 2019/0342456 A1 Nov. 7, 2019

Related U.S. Application Data

(63) Continuation of application No. 15/421,704, filed on Feb. 1, 2017, now Pat. No. 10,389,885.

(51) Int. Cl.
*H04M 9/08* (2006.01)
*G10L 21/0208* (2013.01)
*G10L 21/0216* (2013.01)

(52) U.S. Cl.
CPC ......... *H04M 9/082* (2013.01); *G10L 21/0208* (2013.01); *G10L 2021/02082* (2013.01); *G10L 2021/02166* (2013.01)

(58) Field of Classification Search
CPC .... H04M 9/082; H04B 15/00; G10L 21/0208; G10L 2021/02166; G10L 2021/02082; G10K 11/16; H04R 3/005

(Continued)

(56) References Cited

U.S. PATENT DOCUMENTS

| 8,942,382 B2 * | 1/2015 | Elko | H04M 9/082 |
| | | | 381/66 |
| 9,210,499 B2 | 12/2015 | Sun et al. | |

(Continued)

FOREIGN PATENT DOCUMENTS

| WO | 2015/013058 A1 | 1/2015 |
| WO | 2016/004225 A1 | 1/2016 |

OTHER PUBLICATIONS

Haohai Sun et al., "Space Domain Optimal Beamforming For Spherical Microphone Arrays", 2010 IEEE International Conference on Acoustics Speech and Signal Processing (ICASSP), Mar. 14-19, 2010, DOI: 10.1109/ICASSP.2010.5496143, 4 pages.

(Continued)

*Primary Examiner* — Md S Elahee
(74) *Attorney, Agent, or Firm* — Edell, Shapiro & Finnan, LLC

(57) ABSTRACT

A loudspeaker is driven with a loudspeaker signal to generate sound, and sound is converted to one or more microphone signals with one or more microphones. The microphone signals are concurrently transformed into far-field beam signals and near-field beam signals. The far-field beam signals and the near-field beam signals are concurrently processed to produce one or more far-field output signals and one or more near-field output signals, respectively. Echo is detected and canceled in the far-field beam signals and in the near-field beam signals. When the echo is not detected above a threshold, the one or more far-field output signals are outputted. When the echo is detected above the threshold, the one or more near-field output signals are outputted. A signal based on the one or more output signals is transmitted.

20 Claims, 4 Drawing Sheets

(58) Field of Classification Search
USPC .................................................. 379/406.08
See application file for complete search history.

(56) References Cited

U.S. PATENT DOCUMENTS

| | | | |
|---|---|---|---|
| 9,232,309 B2 | 1/2016 | Zheng et al. | |
| 9,288,576 B2 | 3/2016 | Togami et al. | |
| 9,385,779 B2 | 7/2016 | Sun | |
| 2004/0120271 A1* | 6/2004 | LaBlanc | H04M 9/082 370/286 |
| 2010/0323652 A1* | 12/2010 | Visser | H04R 3/005 455/232.1 |
| 2011/0111805 A1 | 5/2011 | Paquier et al. | |
| 2011/0125494 A1 | 5/2011 | Alves et al. | |
| 2013/0317783 A1* | 11/2013 | Tennant | G10L 21/0208 702/191 |
| 2014/0286497 A1* | 9/2014 | Thyssen | H04R 3/005 381/66 |
| 2018/0220007 A1 | 8/2018 | Sun et al. | |

OTHER PUBLICATIONS

Walter Kellerman, "Strategies for Combining Acoustic Echo Cancellation and Adaptive Beamforming Microphone Arrays", 1997 IEEE International Conference on Acoustics, Speech, and Signal Processing, ICASSP-97, Apr. 21-24, 1997, DOI: 10.1109/ICASSP.1997.599608, 4 pages.

Simon Doclo et al., "Design of far-field and near-field broadband beamformers using eigenfilters", Signal Processing, vol. 83, Issue 12, Dec. 2003, pp. 2641-2673, 33 pages.

Walter Kellerman, "Joint Design of Acoustic Echo Cancellation and Adaptive Beamforming for Microphone Arrays", Proc. 5th Internat Workshop on Acoustic Echo and Noise Control (IWAENC), Imperial College, London, UK 1997, 4 pages.

Haohai Sun et al., "Optimal 3-D HOA Encoding With Applications in Improving Close-Spaced Source Localization", 2011 IEEE Workshop on Applications of Signal Processing to Audio and Acoustics, Oct. 16-19, 2011, New Paltz, NY, 4 pages.

Haohai Sun et al., "Robust Minimum Sidelobe Beamforming for Spherical Microphone Arrays", IEEE Transactions on Audio, Speech, and Language Processing, vol. 19, No. 4, May 2011, 7 pages.

Haohai Sun et al., "Robust Spherical Microphone Array Beamforming With Multi-Beam-Multi-Null Steering, and Sidelobe Control", 2009 IEEE Workshop on Applications of Signal Processing to Audio and Acoustics, Oct. 18-21, 2009, New Paltz, NY, 4 pages.

Dave Michels, "Cisco Siri-ous about Monica", http://www.nojitter.com/post/240171827/cisco-sirious-about-monica, Jul. 18, 2016, last accessed Jan. 30, 2017, 2 pages.

"Microphone Array", Microsoft Research, http://research.microsoft.com/en-us/projects/microphone_array/, downloaded from the internet on Mar. 29, 2016, 4 pages.

S. Yan et al., "Optimal Modal Beamforming for Spherical Microphone Arrays", IEEE Tranasactions on Audio, Speech, and Language Processing, vol. 19, No. 2, Feb. 2011, 11 pages.

H. Sun et al., "Optimal Higher Order Ambisonics Encoding With Predefined Constraints", IEEE Transactions on Audio, Speech, And Language Processing, vol. 20, No. 3, Mar. 2012, 13 pages.

Shefeng Yan, "Broadband Beamspace DOA Estimation: Frequency-Domain and Time-Domain Processing Approaches", Hindawi Publishing Corporation, EURASIP Journal on Advances in Signal Processing, vol. 2007, Article ID 16907, doi:10.1155/2007/16907, Sep. 2006, 10 pages.

Joseph T. Khalife, "Cancellation of Acoustic Reverberation Using Adaptive Filters", Center for Communications and Signal Processing, Department of Electrical and Computer Engineering, North Carolina State University, Dec. 1985, CCSP-TR-85/18, 91 pages.

G. W. Elko and A. N. Pong, "A steerable and variable first-order differential microphone array," in Proc. ICASSP 1997, vol. 1, pp. 223-226, 1997.

H. Teutsch and G. W. Elko, "An adaptive close-talking microphone array," in Proc IEEE WASPAA, pp. 163-166, 2001.

H, Teutsch and G. W Elko, "First- and second-order adaptive differential microphone arrays," in Proc. IWAENC 2001, pp. 35-38, 2001.

M. Buck, "Aspects of first-order differential microphone arrays in the presence of sensor imperfections," Eur. Trans. Telecomm., vol. 13, pp. 115-122, 2002.

M. Buck et al., "A compact microphone array system with spatial post-filtering for automotive applications," in Proc. ICASSP 2009, pp. 221-224, 2009.

Y. Kerner and H. Lau, "Two microphone array MVDR beamforming with controlled beamwidth and immunity to gain mismatch," Proc. IWAENC 2012, pp. 1-4, Sep. 2012.

H. Sun, et al., "Robust Minimum Sidelobe Beamforming for Spherical Microphone Arrays," IEEE Trans Audio Speech Lang Proc, vol. 19, pp. 1045-1051, 2011.

H. Sun, et al., Worst-case performance optimization for spherical microphone array modal beamformers, in Proc. of HSCMA 2011, pp. 31-35, 2011.

O. Tiergart, et al., "Localization of Sound Sources in Reverberant Environments Based on Directional Audio Coding Parameters," in 127th AES Convention, Paper 7853, New York, USA, 2009.

* cited by examiner

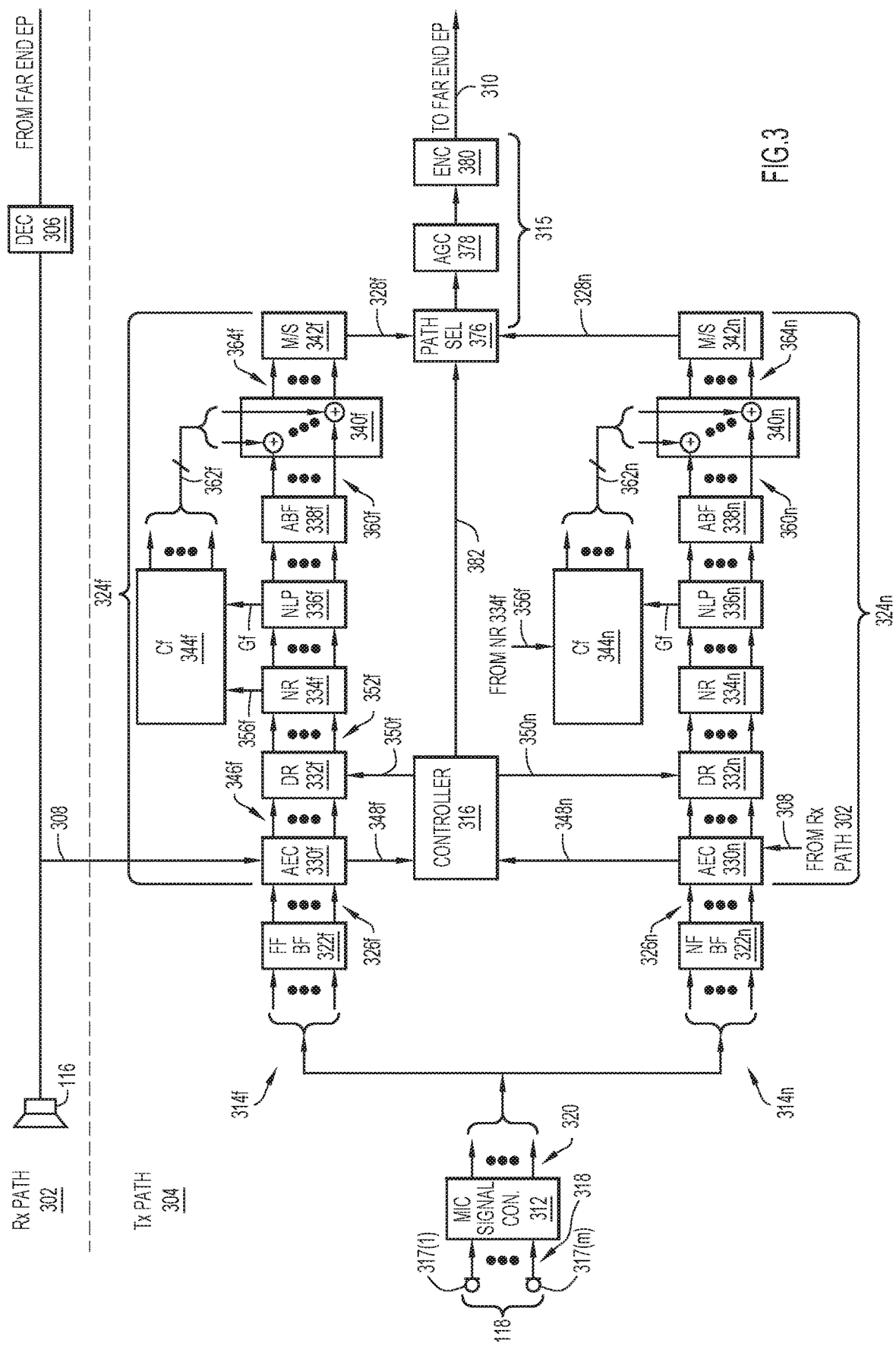

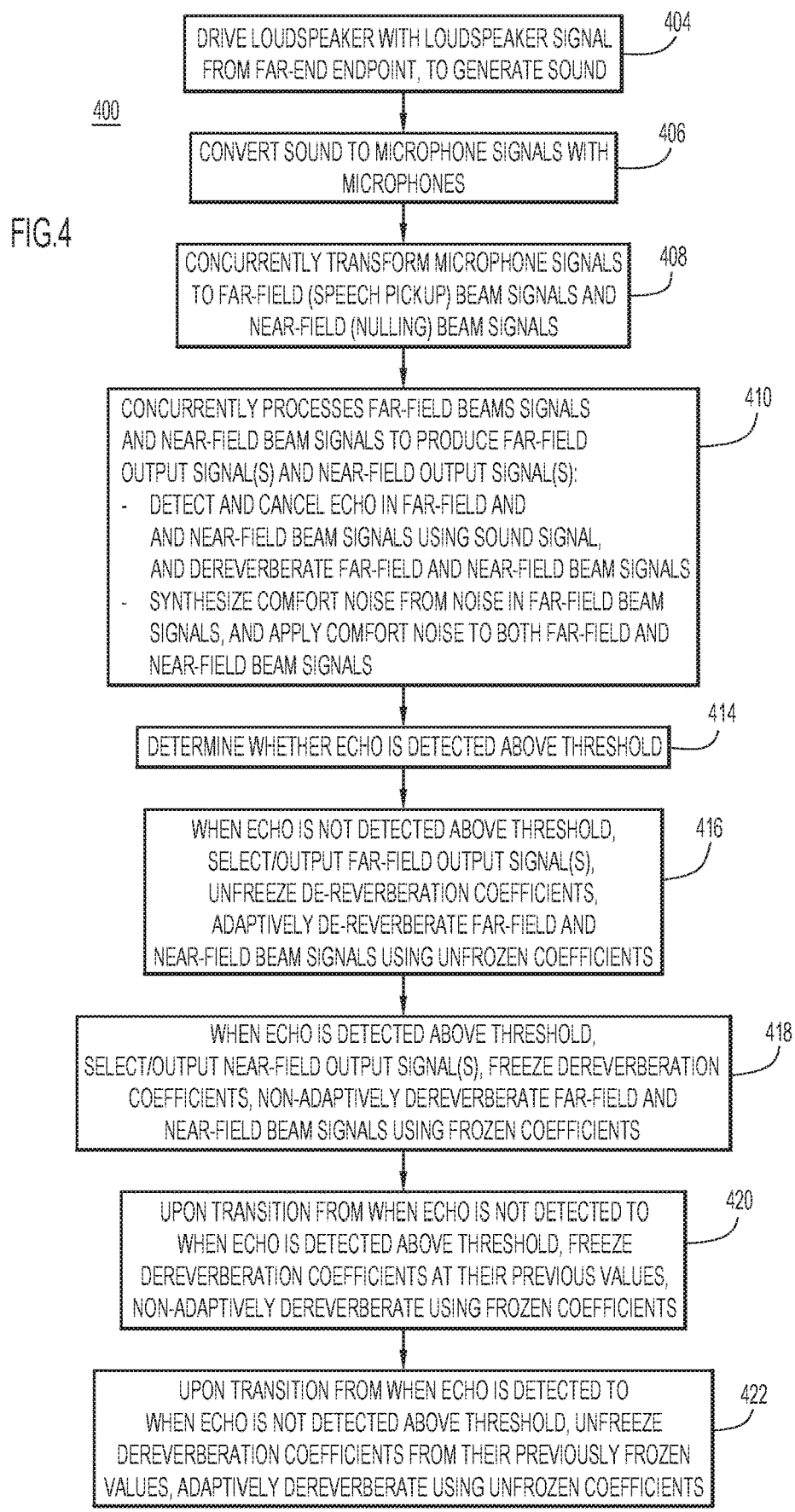

FULL-DUPLEX ADAPTIVE ECHO CANCELLATION IN A CONFERENCE ENDPOINT

CROSS-REFERENCE TO RELATED APPLICATION

This application is a continuation application of U.S. application Ser. No. 15/421,704, filed on Feb. 1, 2017 the entirety of which is incorporated herein by reference.

TECHNICAL FIELD

The present disclosure relates to full-duplex adaptive echo cancellation.

BACKGROUND

To achieve reliable and easy-to-use far-field voice interfaces for Internet-of-Things (IoT) applications and room-based audio communications, collaboration endpoints may integrate a microphone and a loudspeaker into one unit/enclosure. The microphone and the loudspeaker may be close to each other, while a distance from the microphone to a talker may be much larger than the distance between the microphone and the loudspeaker. This presents a challenge in that a high level acoustic signal originating at a far-end collaboration endpoint and propagated via the loudspeaker may be captured by the microphone as an echo, with a high echo-to-near-end speech ratio. The high echo-to-near-end speech ratio may cause poor full-duplex, especially "double talk," audio performance. While it is possible to optimize a beamformer fed by a set of microphones to suppress acoustic echo, such a solution consumes a degree of freedom for the microphone system, and may therefore compromise far-field speech pickup, noise reduction, and dereverberation performance.

BRIEF DESCRIPTION OF THE DRAWINGS

FIG. 3 is a block diagram of a simplified receive path and a transmit path of the video conference endpoint, according to an example embodiment.

FIG. 4 is a flowchart of a method of generating an encoded sound signal in the transmit path of the video conference endpoint based on a detected sound signals, according to an example embodiment.

DESCRIPTION OF EXAMPLE EMBODIMENTS

Overview

An endpoint device includes a loudspeaker and one or more microphones. The loudspeaker is driven with a loudspeaker signal to generate sound. Sound is converted to one or more microphone signals with the one or more microphones. The one or more microphone signals are concurrently transformed into far-field beam signals representative of far-field beams and near-field beam signals representative of near-field beams. The far-field beam signals and the near-field beam signals are concurrently processed to produce one or more far-field output signals and one or more near-field output signals, respectively. In the concurrent processing, echo is detected and canceled in the far-field beam signals and in the near-field beam signals based on the loudspeaker signal. It is determined whether the echo is detected above a threshold. When the echo is not detected above the threshold, the one or more far-field output signals are outputted. When the echo is detected above the threshold, the one or more near-field output signals are outputted. A signal based on the one or more output signals is transmitted.

Example Embodiments

Figure 1A:
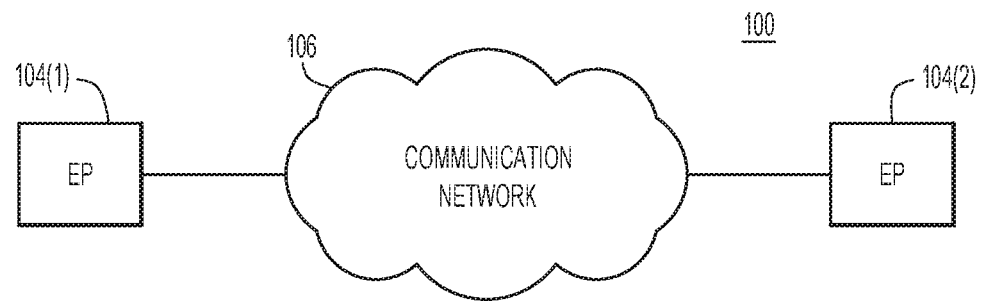
FIG. 1A is a block diagram of a full-duplex communication environment, according to an example embodiment.

With reference to FIG. 1A, there is an illustration of an example video conference (e.g., teleconference) environment 100 in which embodiments presented herein may be implemented. Environment 100 includes a video conference endpoint (EP) 104(1) and an endpoint 104(2) engaged in a full-duplex video conference/communication session over a communication network 106. Each video conference endpoint 104(i) may be referred to as an "endpoint device" or simply an "endpoint." During the full-duplex communication session, endpoints 104(1) and 104(2) each capture and encode sound and video from local participants, and transmit the encoded sound and video to the other (e.g., far-end) endpoint over network 106. Also, endpoints 104(1) and 104(2) each receives encoded sound and video transmitted by the other (e.g., far-end) endpoint, decodes the received encoded sound and video, and presents the resulting sound and video to the local participants.

Figure 1B:
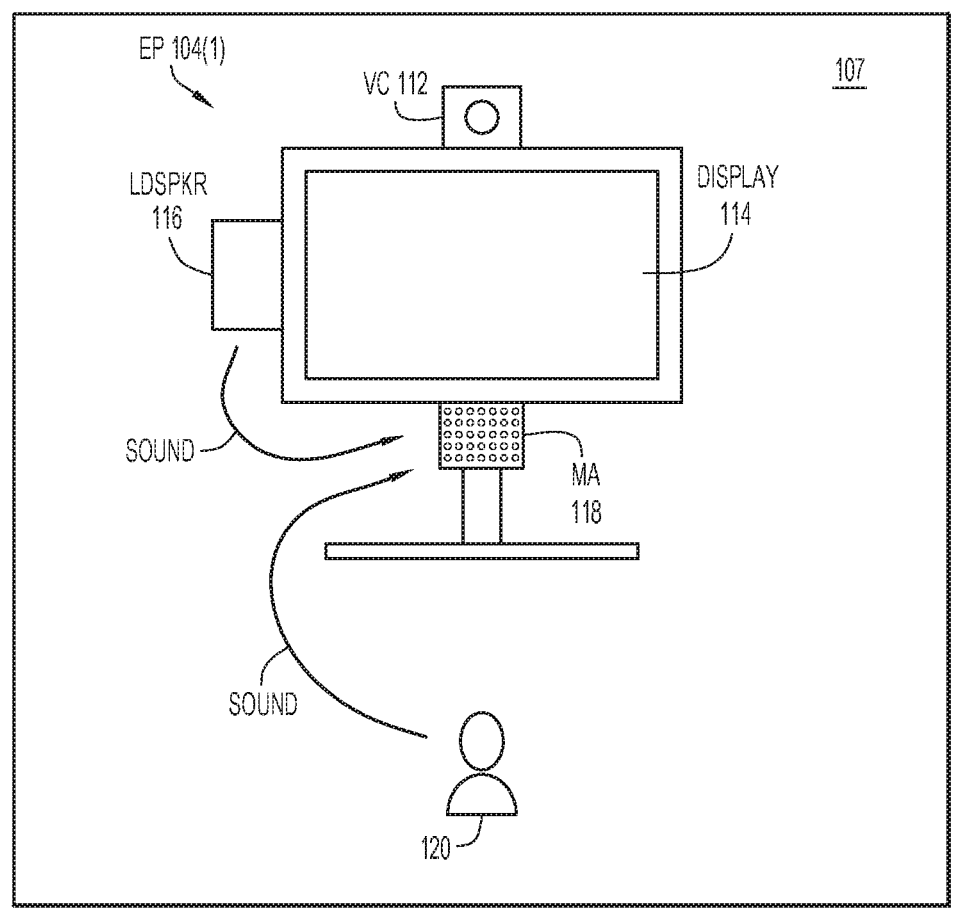
FIG. 1B is an illustration of a video conference (e.g., teleconference) endpoint deployed in a room with a conference participant, according to an example embodiment.

With reference to FIG. 1B, there is an illustration of endpoint 104(1), according to an embodiment. Endpoint 104(1) is shown deployed in a room 107. Endpoint 104(1) includes a video camera (VC) 112, a video display 114, a loudspeaker (LDSPKR) 116, and a microphone array (MA) 118 including multiple microphones. Alternatively, endpoint 104(1) may include a single microphone. Generally, endpoint 104(1) may be a wired and/or a wireless communication device equipped with the aforementioned components, such as, but not limited to laptop and tablet computers, smartphones, and the like. Endpoint 104(1) radiates from loudspeaker 116 sound received from a far-end endpoint (e.g., endpoint 104(2)). Microphone array 118 detects sound from local participant 120. When loudspeaker 116 and microphone array 118 are near one another, the sound radiated from the loudspeaker that originated at the far-end endpoint may be much louder at microphone array 118 than the sound originated from local participant 120, especially when the local participant is separated an appreciable distance from the microphone array. The sound radiated from loudspeaker 116 and detected at microphone array 118, when transmitted back to and presented at the far-end endpoint, represents undesired echo at the far-end endpoint. Accordingly, embodiments presented herein implement techniques in a transmit path of endpoint 104(1) to eliminate the undesired echo.

Figure 2:
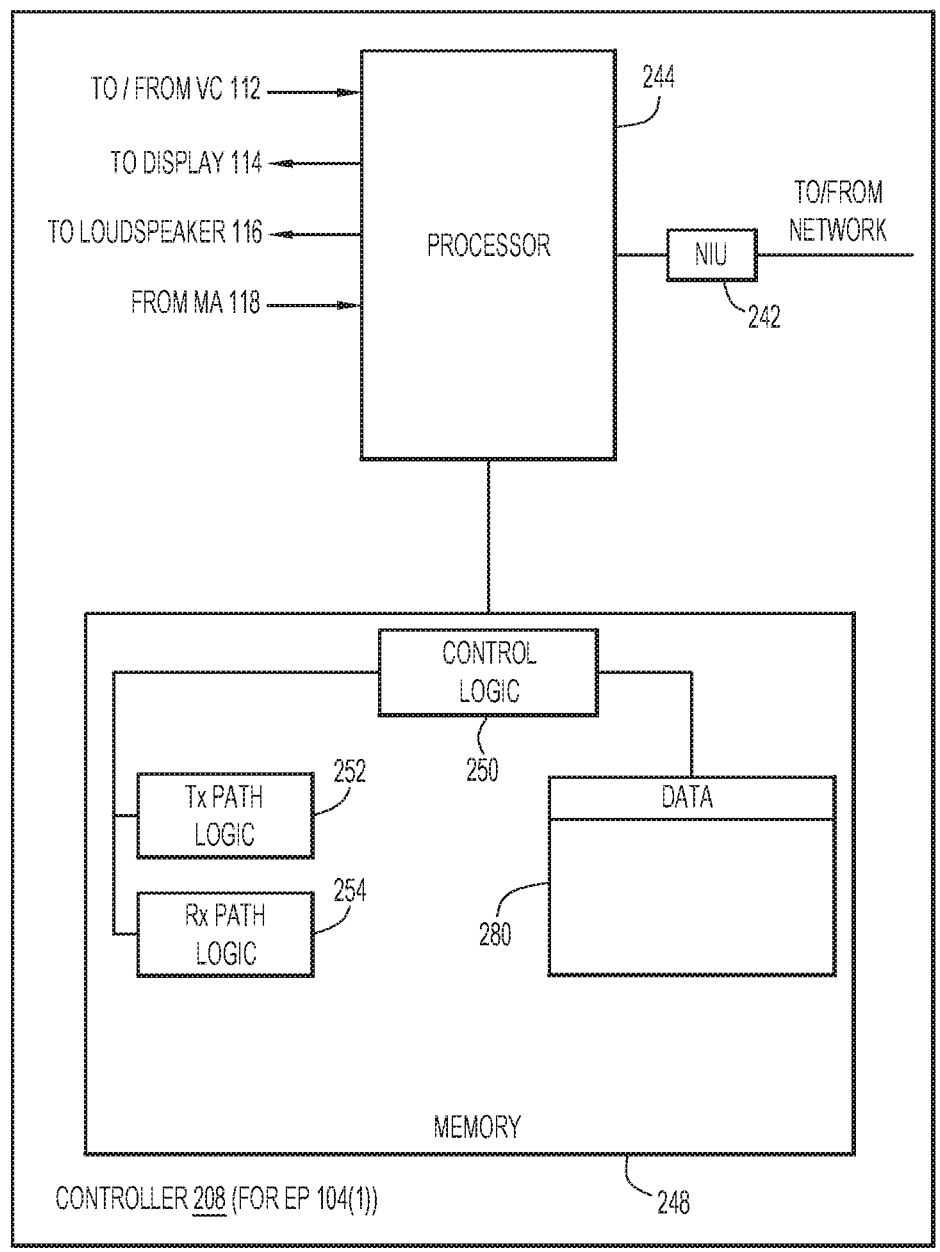
FIG. 2 is block diagram of a controller of the video conference endpoint, according to an example embodiment.

With reference to FIG. 2, there is shown a block diagram of an example controller 208 of endpoint 104(1) configured to perform embodiments presented herein. There are numerous possible configurations for controller 208 and FIG. 2 is meant to be an example. Controller 208 includes a network interface unit (NIU) 242, a processor 244, and memory 248. The aforementioned components of controller 208 may be implemented in hardware, software, firmware, and/or a combination thereof. NIU 242 enables controller 208 to communicate over wired connections or wirelessly with a network. NIU 242 may include, for example, an Ethernet card or other interface device having a connection port that enables controller 208 to communicate over the network via the connection port. In a wireless embodiment, NIU 242 includes a wireless transceiver and an antenna to transmit and receive wireless communication signals to and from the network.

Processor 244 may include a collection of microcontrollers and/or microprocessors, for example, each configured to execute respective software instructions stored in the memory 248. The collection of microcontrollers may include, for example: a video controller to receive, send, and process video signals related to display 114 and video camera 112; an audio processor to receive, send, and process audio signals related to loudspeaker 116 and microphone array 118; and a high-level controller to provide overall control. Portions of memory 248 (and the instruction therein) may be integrated with processor 244. In a transmit direction, processor 244 processes audio/video captured by MA 118/VC 112, encodes the captured audio/video into data packets, and causes the encoded data packets to be transmitted to communication network 106. In a receive direction, processor 244 decodes audio/video from data packets received from communication network 106 and causes the audio/video to be presented to local participant 120 via loudspeaker 116/display 114. As used herein, the terms "audio" and "sound" are synonymous and used interchangeably.

The memory 248 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 248 may comprise one or more computer readable storage media (e.g., a memory device) encoded with software comprising computer executable instructions and when the software is executed (by the processor 244) it is operable to perform the operations described herein. For example, the memory 248 stores or is encoded with instructions for control logic 250 perform operations described herein.

Control logic 250 may include logic 252 of a transmit (TX) path to perform signal processing of sound in the transmit direction, and logic 254 of a receive (RX) path to perform signal processing of sound in the receive direction. In addition, memory 248 stores data 280 used and generated by modules/logic 250-254, including, but not limited to, digitized sound, a predetermined echo threshold, dereverberation coefficients, and far-field and near-field beam coefficients.

With reference to FIG. 3, there is a block diagram of an example, simplified receive path 302 and an example transmit path 304 of endpoint 104(1). Receive path 302 includes sound processing modules of logic 254 from FIG. 2, and transmit path 304 includes sound processing modules of logic 252 from FIG. 2. Receive path 302 includes a sound decoder (DEC) 306 followed by a loudspeaker 116. Sound decoder 306 receives encoded sound transmitted from a far-end endpoint (e.g., endpoint 104(2)), decodes the encoded sound to produce a sound signal 308, and provides the sound signal to both loudspeaker 116 and transmit path 304. Loudspeaker 116 converts sound signal 308 to sound and radiates the sound.

Transmit path 304 processes sound detected by microphone 118 in accordance with embodiments described below, to produce an encoded output signal 310 (or multiple encoded output signals in parallel as described below) to be transmitted to the far-end endpoint. Transmit path 304 includes a microphone signal converter 312, a far-field path 314$f$, a near-field path 314$n$ in parallel with the far-field path, an output path 315 fed in parallel by both the far and near-field paths, and a controller 316 to control the far-field path, the near-field path, and the output path. The terms "parallel" and "in parallel" are synonymous, and used interchangeably, with the terms "concurrent" and "concurrently," respectively. Transmit path 304 is now described in detail.

Microphones 317(1)-317(M) of microphone array 118 concurrently detect sound to produce a parallel (i.e., concurrent) set of M microphone signals 318(1)-318(M) (collectively referred to as "microphone signals 318") each from a corresponding microphone in the microphone array. In other words, microphone array 118 converts the sound into M microphone signals 318, and provides the microphone signals to microphone signal converter (MIC Signal Con.) 312. Microphone signal converter 312 includes M parallel amplifiers followed by M parallel analog-to-digital converters (ADCs) (not shown in FIG. 3), to amplify and digitize each of the M microphone signals 318, to produce a set of M parallel digitized microphone signals 320. Microphone signal converter 312 provides digitized microphone signals 320 to far-field path 314$f$ and near-field path 314$n$ in parallel. Far-field paths 314$f$, 314$n$ each include a series of array processors (described below) for processing sound vectors, i.e., sets of parallel sound signals. In one embodiment, the array processors process sound in the time domain, i.e., the sound signals are broadband time domain signals. In another embodiment, the array processors process sound in the frequency domain, i.e., the sound signals are time-domain signals in multiple frequency bands. In FIG. 3, and in the ensuing description, corresponding sound processing modules/arrays and signals in far-field path 314$f$ and near-field path 314$n$ are identified with the same reference numerals, except for the suffixes "f" and "n" to denote the far-field and the near-field paths, respectively.

Far-field path 314$f$ includes a far-field beamformer (FF BF) 322$f$ followed by a far-field beam processor 324$f$. Far-field beamformer 322$f$ transforms digitized microphone signals 320 into a parallel set of F (F$>=$1) far-field sound beam signals/channels 326$f$ (referred to more simply as "far-field beam signals 326$f$") representative of F parallel far-field sound beams or sound channels, and provides the far-field beam signals to far-field beam processor 324$f$ The F far-field beams are optimized/configured for far-field speech pickup/detection (e.g., optimized for sound sources many feet from the microphone array 118), and typically have different "look" directions with respect to a planar face of microphone array 118 for the far-field speech pickup. That is, the F far-field beams may point in different directions into room 107 so as to coincide directionally with a far-field sound source, such as participant 120. Far-field beamformer 322$f$ may implement an algorithmic beamforming structure, e.g., either a filter-and-sum structure in the time domain or a weighting-and-sum structure in the frequency domain. The beamforming filter coefficients in the time domain, or beamforming weighting factors in the frequency domain, (collectively, "beamforming coefficients") used are derived/obtained using a far-field array signal model and sound-field decomposition technique, as would be appreciated by one of ordinary skill in the relevant arts with access to the present disclosure.

Far-field beam processor 324$f$ concurrently processes far-field beam signals 326$f$, to produce one or more far-field output signals 328$f$. That is, far-field beam processor 324$f$ processes each of far-field beam signals 326f individually and in parallel with the other ones of the far-field beam signals, to produce one or more far-field output signals 328f. Far-field beam processor 324f includes, in series, an adaptive echo canceler (AEC) 330f to substantially cancel echo in far-field beam signals 326f, an adaptive dereverberator (DR) 332f to implement an adaptive dereverberation algorithm to dereverberate the far-field beam signals, a noise reducer (NR) 334f to reduce background noise in the far-field beam signals, a non-linear processor (NLP) 336f to eliminate residual echo from the far-field beam signals, an adaptive beamformer (ABF) module 338f, a summer or combiner 340f to insert comfort noise into the far-field beam signals, and a mixer/selector (M/S) 342f to output the one or more far-field output signals 328f. Far-field beam processor 324f also includes a far-field comfort noise generator (CF) 344f to generate the aforementioned comfort noise. Comfort noise generator 344f is shown separately in FIG. 3 by way of example, only. In another arrangement, comfort noise generator 344f may be integrated with noise reducer 334f and/or NLP 336f. Also, the depicted serial order of the aforementioned modules in far-field path 314f may be permuted. Moreover, one or more of modules, e.g., ABF module 338f, may be omitted. In one arrangement, only AEC 330f is included. In another arrangement, only AEC 330f, and DR 332f is included.

AEC 330f detects, and substantially cancels echo in, far-field beam signals 326f based on sound signal 308 from receive path 302, to produce echo canceled far-field beam signals 346f. AEC 330f may be implemented using any known or hereafter developed AEC technique, as would be appreciated by one of ordinary skill in the relevant arts. AEC 330f provides the echo canceled far-field beam signals 346f to adaptive dereverberator 332f. AEC 330f also generates, and provides to controller 316, a signal 348f that indicates a level of the echo detected (i.e., detected echo level) in far-field beam signals 326f.

Responsive to a control signal 350f from controller 316, adaptive dereverberator 332f selectively either adaptively dereverberates or non-adaptively dereverberates the echo canceled far-field beam signals from AEC 330f, to produce dereverberated, echo canceled far-field beam signals 352f. Thus, adaptive dereverberator 332f dereverberates far-field beam signals 326f, at least indirectly. Adaptive dereverberator 332f may dereverberate the echo-canceled far-field beam signals in the time domain/frequency domain based on adaptive time domain filter coefficients/adaptive frequency domain weights (collectively referred to as dereverberation coefficients) using any known or hereafter developed time domain/frequency domain dereverberation technique. Adaptive dereverberator 332f provides the dereverberated, echo canceled far-field beam signals 352f to noise reducer 334f.

When controller 316 asserts control signal 350f to a first state to cause dereverberator 332f to adaptively dereverberate the echo canceled far-field beam signals, adaptive dereverberator 332f permits the dereverberation coefficients to adapt to/change with reverberation conditions over time. On the other hand, when controller 316 asserts control signal 350f to a second state to cause dereverberator 332f to non-adaptively dereverberate the echo canceled far-field beam signals, adaptive dereverberator 332f freezes (i.e., fixes) states of the adaptive dereverberation algorithm (e.g., the dereverberation coefficients) at values previously used (while the control signal was in the first state), so that the states of the otherwise adaptive dereverberation algorithm (e.g., the dereverberation coefficients) do not adapt over time. For example, when control signal 350f is in the first state, dereverberator 332f permits/allows the dereverberation coefficients to adapt or change over time (i.e., dereverberator 332f "unfreezes" the dereverberation coefficients). When control signal 350f transitions from the first state to the second state, dereverberator 332f fixes (i.e., freezes) the dereverberation coefficients at values used prior to the transition. When control signal 350f transitions from the second state back to the first state, dereverberator 332f unfreezes the dereverberation coefficients, which may then adapt or change over time. Control of adaptive dereverberator 332f is described more fully below in connection with FIG. 4.

Noise reducer 334f, NLP 336f, and ABF module 338f further process the dereverberated, echo canceled far-field beam signals 352f (and thus perform their respective operations on far-field beam signals 326f, at least indirectly), to produce processed far-field beam signals 360f, and provide the processed far-field beam signals to combiner 340f. Noise reducer 334f reduces/suppresses background noise in the dereverberated, echo canceled far-field beam signals 352f. Noise reducer 334f also estimates a noise level 356f in dereverberated, echo canceled far-field beam signals 352f, and provides the far-field noise level estimate to comfort noise generator 344f. NLP 336f eliminates residual echo in the dereverberated, echo canceled beam signals based on a far-field NLP gain Gf (e.g., also referred to an "NLP masking gain Gf"). NLP 336f provides an indication of the far-field NLP gain Gf to comfort noise generator 344f. ABF module 338f communicates with far-field beamformer 322f and adapts the far-field beamforming coefficients therein to optimize the far-field beams for far-field sound pickup.

Comfort noise generator 344f generates or synthesizes far-field comfort noise based on far-field noise level estimate 356f and far-field NLP gain Gf associated with far-field beam signals 326f. Any known or hereafter developed technique for generating comfort noise based on a noise level estimate and an NLP gain may be used. In one example, in a given time frame, and for a given beam signal 326f(i)/channel, assuming a noise level estimate N, and an NLP gain G, the comfort noise CN for this time frame and beam signal/channel may be generated as $CN=N*(1-G)*RandomNumber$, where the RandomNumber may be either real-valued (time domain implementation) or complex valued (frequency domain implementation).

Comfort noise generator 344f provides the far-field comfort noise to combiner 340f as a set of parallel comfort noise signals 362f each corresponding to a respective one of parallel processed far-field beam signals 360f. Combiner 340f includes a set of parallel combiners to combine each of comfort noise signals 362f with the corresponding one of processed far-field beam signals 360f, to produce a set of processed far-field beam signals 364f including the comfort noise.

Mixer/selector 342f mixes processed far-field beam signals 364f, to produce the one or more far-field output signals 328f as a far-field signal. Mixer/selector 342f may mix processed far-field beam signals 364f using any known or hereafter developed sound mixing technique, including auto-mixing techniques. Alternatively, mixer/selector 342f selects (i) one or more preferred ones of the processed far-field beam signals 364f as one or more far-field output signals based on a selection criterion. For example, mixer/selector 342f may select the one of the processed far-field beam signals 364f (which may also be referred to as a far-field mono-signal) having a maximum signal-to-noise ratio among the processed far-field beam signals. In another example, mixer/selector 342f may select two of processed far-field beam signals 364f having the two highest signal-to-noise ratios. In another example, two beams with beam patterns suitable for stereo pickup may be selected. Also, more than two of the processed far-field beam signals 364f may be selected. Controller 316 may selectively command mixer/selector 342f to perform either the sound mix operation or the select operation.

Near-field path 314n includes a near-field beamformer (NF BF) 322n followed by a near-field beam processor 324n. Near-field beamformer 322n and near-field beam processor 324n perform their respective operations in parallel with far-field beamformer 322f and far-field beam processor 324f, respectively. Near-field beamformer 322n transforms digitized microphone signals 320 into a parallel set of N (N>=1) near-field sound beam signals/channels 326n (referred to more simply as "near-field beam signals 326n") representative of N parallel near-field beams, and provides the near-field beam signals to near-field beam processor 324n.

The N parallel near-field beams represent nulling beams optimized/configured to suppress near-field acoustic echo arriving at microphone array 118 from a direction coinciding with loudspeaker 116 and associated echoes. That is, the N near-field beams treat the acoustic echo as a near-field noise source, i.e., loudspeaker 116 approximately one foot or less away from microphone array 118, and use null steering techniques and a near-field array signal model to suppress the acoustic echo from the loudspeaker and associated early acoustic reflections. Typically, the location of the loudspeaker 116 relative to microphone array 118 is known and thus the nulling directions in the near-field beams may be derived. In other arrangements, calibrations may be performed to establish the nulling directions. In still other arrangements, nulling directions may be established adaptively over time and without an a priori knowledge of loudspeaker placement. Near-field beamformer 322n may implement an algorithmic beamforming structure, e.g., either a filter-and-sum structure in the time domain or a weighting-and-sum structure in the frequency domain. The filter coefficients (or weighting factors) (collectively, "beamforming coefficients") used are derived/obtained using a near-field array signal model, as would be appreciated by one of ordinary skill in the relevant arts with access to the present disclosure.

Near-field beam processor 324n concurrently processes near-field beam signals 326n, to produce one or more near-field output signals 328n. That is, near-field beam processor 324n processes each of near-field beam signals 326n individually and in parallel with the other ones on the near-field beam signals, to produce one or more near-field output signals 328n. Near-field beam processor 324n is configured to operate substantially similarly to far-field beam processor 324f, except that (i) the near-field beam processor processes near field beam signals 326n instead of far-field beams signals 326f, and (ii) a comfort noise generator 344n of the near-field beam processor synthesizes comfort noise to be applied to the near-field beam signals based on far-field noise level estimate 356f instead of a near-field noise level estimate, as described below.

Near-field beam processor 324n includes, in series: an adaptive echo canceler (AEC) 330n to substantially cancel echo in near-field beam signals 326n based on sound signal 308, and provide to controller 316 a level of the echo detected (i.e., detected echo level) 348n in the near-field beam signals; an adaptive dereverberator 332n to selectively either adaptively dereverberate or non-adaptively dereverberate the near-field beam signals responsive to a control signal 350n from controller 316 (similar to the manner in which adaptive dereverberator 332f operates responsive to control signal 350f); a noise reducer 334n to reduce background noise in the near-field beam signals; an NLP 336n to eliminate residual echo from the near-field beam signals based on a near-field NLP gain Gn (where Gn=Gf in some arrangements); an adaptive beamformer (ABF) module 338n; and a mixer/selector 342n to output one or more near-field output signals 328n.

Near-field beam processor 324n also includes near-field comfort noise generator 344n to synthesize comfort noise signals 362n based on near-field NLP gain Gn and far-field noise level estimate 356f from noise reducer 334f in far-field processor path 314f. Thus, comfort noise signals 362n and far-field comfort noise signals 362f represent similar levels of comfort noise because both sets of comfort noise signals are derived from the noise present in far-field beam signals 326f, not near-field beam signals 326n.

Comfort noise generator 344n provides the comfort noise generated thereby to combiner 340n as a set of parallel comfort noise signals 362n each corresponding to a respective one of parallel processed far-field beam signals 360n. Combiner 340n includes a set of parallel combiners to combine each of comfort noise signals 362n with the corresponding one of processed far-field beam signals 360n, to produce a set of processed near-field beam signals 364n including the comfort noise.

Mixer/selector 342n mixes processed near-field beam signals 364n, to produce the one or more near-field output signals 328n. Mixer/selector 342n may use any known or hereafter developed sound mixing technique. Alternatively, mixer/selector 342n selects (i) one or more preferred ones of the processed near-field beam signals 364n as one or more near-field output signals based on a selection criterion. For example, mixer/selector 342n may select the one of the processed near-field beam signals 364n (which may also be referred to as a near-field mono-signal) having a maximum signal-to-noise ratio among the processed far-field beam signals. In another example, mixer/selector 342n may select two of processed far-field beam signals 364n having the two highest signal-to-noise ratios. In another example, stereo signals may be selected. Also, more than two of the processed near-field beam signals 364n may be selected. Controller 316 may selectively command mixer/selector 342n to perform either the sound mix operation or the select operation.

Output path 315 includes, in series, a path selector 376, an automatic gain control (AGC) controller 378, and a sound encoder 380. Path selector 376 receives the one or more far-field output signals 328f (either a far-field mono-signal or multiple far-field output signals) and the one or more near-field output signals 328n (either a near-field mono-signal or multiple near-field output signals) at respective sets of far-field inputs and near-field inputs of the path selector. Responsive to a control signal 382 from controller 316, path selector 376 selects either the one or more far-field output signals 328f or the one or more near-field output signals 328n, and outputs the selected ones of the one or more output signals to AGC controller 378. In a case where path selector selects and thus outputs a mono-signal, AGC controller 378 performs AGC on the mono-signal, to produce an AGC controlled mono-signal. Sound encoder 380 encodes the AGC controlled mono-signal to produce encoded (mono) sound signal 310 for transmission to the far-end endpoint. Endpoint 104(1) transmits encoded sound signal 310 to the far-end endpoint.

Because path selector 376 may select and output multiple output signals instead of a mono-signal, output path 315 may also include one or more additional AGC controllers and one or more additional sound encoders 380 in parallel with AGC controller 378 and 380 to process the multiple output signals in parallel. Thus, in a case where path selector selects and thus outputs multiple output signals to the multiple parallel AGC controllers and multiple sound encoders, the AGC controllers and sound encoders process the multiple output signals for transmission in parallel, to produce multiple encoded sound signals (e.g., similar to 310) in parallel. Endpoint 104(1) transmits the multiple encoded sound signals to the far-end endpoint in parallel.

Controller 316 controls operation of transmit path 304 while endpoint 104(1) is engaged in a full-duplex audio/visual communication session with a far-end endpoint. Controller 316 receives detected echo levels 348f and 348n from far-field and near-field AECs 330f and 330n, respectively, and generates signals 350f, 350n based on the detected echo levels to cause dereverberators 332f, 332n to selectively either adaptively or non-adaptively dereverberate beam signals 326f, 326n. Controller 316 also generates control signal 382 to cause path selector 376 to select either the one or more far-field output signals 328f or the one or more near-field output signals 328n. Further operational details of controller 316 are described below in connection with FIG. 4.

With reference to FIG. 4, there is a flowchart on an example method 400 of generating encoded sound signal 310 in transmit path 302 from detected sound signals 318 under control of controller 316. Method 400 may be performed while endpoint 104(1) (e.g., a near-end endpoint) and 104(2) (e.g., a far-end endpoint) are engaged in a full-duplex audio communication session with each other.

At 404, receive path 302 generates sound signal 308 to drive loudspeaker 116 from the encoded sound received from the far-end endpoint. Loudspeaker 116 generates loudspeaker sound based on sound signal 308. Loudspeaker 116 radiates the sound into room 107.

At 406, a microphone (e.g., microphone array 118 or a single microphone) and microphone signal converter 312 together convert sound picked up in room 107 to one or more (digitized) microphone signals 320. The sound converted by the microphone may or may not include sound radiated from loudspeaker 116, which would cause echo.

At 408, far-field beamformer 322f and near field beamformer 322n concurrently transform microphone signals 320 into far field beam signals 326f representative of far-field beams and near-field beam signals 326f representative of near-field beams, respectively.

At 410, far-field and near-field beam processors 324f, 324n concurrently process far-field and near-field beam signals 326f, 326n to produce processed far-field and near-field beam signals 364f, 364n, and generate one or more far-field output signals 328f and one or more near-field output signals 328n from the far-field and near-field beam signals, respectively. More specifically, AECs 330f, 330n detect and cancel echo in far-field and near-field beam signals 326f, 326n, dereverberators 332f, 332n dereverberate the far-field and near-field beam signals, noise reducers 334f, 334n reduce noise in the far-field and near-field beam signals, NLPs 336f, 336n perform non-linear processing on the far-field and near-field beam signals, ABF modules 338f, 338n perform adaptive beamforming on the far-field and near-field beam signals, comfort noise generators 344f, 344n synthesize comfort noise signals 362f, 362n based on a level of noise in the far-field beam signals and apply the comfort noise signals to the far-field and near-field beams signals, to produce processed far-field and near-field beams signals 364f, 364n, respectively. Mixer/selectors 342f, 342n either mix, or select from, processed far-field and near-field beam signals 364f, 364n, to produce the one or more far-field output signals 328f and the one or more near-field output signal 328n, respectively.

At 414, controller 316 determines whether either of detected echo levels 348f, 348n exceeds a predetermined echo threshold (i.e., if echo is detected). For example, controller 316 compares each of detected echo levels 348f, 348n to the predetermined echo threshold to determine whether either of the detected echo levels exceeds the predetermined echo threshold. In another embodiment, controller 316 may monitor only one of detected echo levels 348f, 348n. The predetermined echo threshold may be set to a detected echo level that is known to cause reduction of full duplex operation in double-talk situations noticeable/bothersome to human hearing, and may be established empirically or in a calibration. Moreover, the predetermined echo threshold may be adaptive, i.e., adjusted over time to suit different echo environments.

Dereverberation in endpoint 104(1) should adapt towards talking participant 120 (at the near-end), but not towards echo. Thus, controller 316 controls "unfreezing" of dereverberators 332f, 332n to allow them to adapt to reverberation and "freezing" of the dereverberators to prevent them from adapting to reverberation as appropriate, as described below.

If controller 316 determines that neither of detected echo levels 348f, 348n exceeds the predetermined echo threshold (i.e., detected echo level 348f does not exceed the threshold and detected echo level 348n does not exceed the threshold), at 416, controller 316 asserts: (i) each of control signals 350f, 350n to a first state to cause dereverberators 332f, 332n to unfreeze their respective dereverberation coefficients and adaptively dereverberate far-field and near-field beam signals 326f, 326n using the unfrozen dereverberation coefficients (to adapt to talking participant 120), which may change or adapt to reverberant conditions over time; and (ii) control signal 382 to cause path selector 376 to select and output to output path 315 (e.g., to one or more parallel AGC controllers in the output path) the one or more far-field output signals 328f (not the one or more near-field output signals 328n). Output path 315 processes the one or more far-field output signals 328f for transmission to the far-end endpoint. Operation 416 results in optimum far-field speech quality.

If controller 316 determines that either of detected echo levels 348f, 348n exceeds the predetermined echo threshold (i.e., echo is detected), at 418, controller 316 asserts: (i) each of control signals 350f, 350n to a second state to cause dereverberators 332f, 332n to freeze their respective dereverberation coefficients to last values used previously when the coefficients were not frozen, and non-adaptively dereverberate far-field and near-field beam signals 326f, 326n using the frozen values of the dereverberation coefficients (so as not to adapt towards echo); and (ii) control signal 382 to cause path selector 376 to select and output to output path 315 (i.e., to the one or more parallel AGC controllers) the one or more near-field output signals 328n (not the one or more far-field output signals 328f). Thus, output path 315 processes the one or more near-field output signals 328n for transmission to the far-end endpoint. Operation 418 may lead to a reduction in far-field speech quality, but it also reduces the echo-to-near-end-speech ratio when there is a signal from the far-end and thus a need for improved double-talk performance.

In a case where controller 316 detects a transition from when the echo is not detected (i.e., neither of detected echo levels 348$f$, 348$n$ exceeds the predetermined echo threshold) to when the echo is detected (i.e., either of the detected echo levels exceeds the predetermined echo threshold), at 420, the controller transitions control signals 350$f$, 350$n$ from their first states to their second states. Responsive to, and at the time of, the transition, dereverberators 332$f$, 332$n$ freeze their respective dereverberation coefficients at last values used previously for adaptively dereverberating, and use the frozen values for subsequent non-adaptive dereverberating, while the echo continues to be detected.

Conversely, in a case where controller 316 detects a transition from when the echo is detected (i.e., either of the detected echo levels 348$f$, 348$n$ exceeds the predetermined echo threshold), to when the echo is not detected (i.e., neither of the detected echo levels exceeds the predetermined echo threshold), at 422, the controller transitions control signals 350$f$, 350$n$ from their second states to their first states. Responsive to, and at the time of, the transition, dereverberators 332$f$, 332$n$ unfreeze their respective dereverberation coefficients, and use the unfrozen values (which may now adapt to reverberant conditions over time) for subsequent adaptive dereverberating while the echo continues to be not detected, i.e., in the absence of echo.

In the embodiments described above, switching (i.e., selecting) between the one or more far-field output signals 328$f$ and the one or more near-field output signals 328$n$ is based on detecting echo not above or above the echo threshold, respectively. In an alternative embodiment, the switching (i.e., selecting) between the one or more far-field output signals 328$f$ and the one or more near-field output signals 328$n$ may be based on detecting a presence of double-talk not above or above a double-talk threshold, similar to the way in which the switching is performed based on echo. In the alternative embodiment, either of paths 314$f$ and 314$n$ includes logic to detect a presence of double-talk based in part on sound signal 308, and provide an indication of a level of the detected double-talk to controller 316. In turn, controller 316 asserts signals 350$f$, 350$n$, and 382 when the level of double-talk is either not above or above the double-talk threshold similar to the way the controller asserts those signals when the level of echo either not above or above the echo threshold, to achieve similar results as described above. Logic to detect double-talk may conform to any known or hereafter developed technique used to detect double-talk.

The far-field and near-field beam signals 326$f$, 326$n$ usually have different noise floor characters. Thus, without employing the embodiments presented herein, when switching between the one or more far-field output signals 328$f$ (from far-field path 314$f$) and the one or more near-field output signals 328$n$ (from near-field path 314$n$) as described above, participants at the far-end would hear varying noise floor sound radiating from the far-end loudspeaker (e.g., they would hear far-field beam noise, then near-field beam noise), which may be an annoyance. The embodiments presented herein solve this problem in the following manner. As described above, the one or more near-field output signals 328$n$, formed by processing near-field beam signals 326$n$ in near-field path 314$n$, are only selected when the detected echo is above the predetermined echo threshold, which may be indicative of significant echo. In near-field path 314$n$, AEC 330$n$ and NLP 336$n$ together remove most if not all of the echo in near-field beam signals 326$n$ (together with an associated noise floor of the near-field beam signals) to produce silence in processed near-field beam signals 360$n$. In that case, comfort noise generator 344$n$ generates comfort noise (represented in near-field comfort noise signals 362$n$) from noise level estimate 356$f$ derived from far-field beams signals 326$f$ (not the near-field beam signals), and applies the comfort noise to processed near-field beam signals 360$n$ to fill the silence. Because the comfort noise is generated from noise in far-field beam signals 326$f$, the comfort noise manifested in the one or more near-field output signals 328$n$ is essentially the same level of comfort noise manifested in the one or more far-field output signals 328$f$. In this way, the problem of a varying noise floor due to switching between the one or more far-field output signals 328$f$ and the one or more near-field output signals 328$n$ is mitigated, since the noise in each is essentially the same.

Summarizing the embodiments presented herein, an endpoint includes parallel far-field and near-field paths to process F far-field beams and N near-field (nulling) beams, respectively, in a transmit direction. When acoustic echo is detected below a threshold, the far-field path performs an adaptive multi-channel dereverberation algorithm on the F far-field beams, to produce F dereverberated far-field beams, and selects or mixes the F dereverberated beams to a (far-field) output signal (e.g., a far-field mono-signal). An output path processes the one or more output signals using AGC, encoding, and the like, for transmission to a far-end. These operations result in optimum far-field speech quality.

In contrast, when acoustic echo is detected above the threshold, adaptation of the adaptive dereverberation algorithm is frozen and states of adaptive filters used for dereverberation in the adaptive dereverberation algorithm are saved. The near-field path processes the N near-field beams using non-adaptive dereverberation, to produce N dereverberated near-field beams. The near-field path mixes, or selects from, only the N dereverberated near-field beams, to produce one or more (near-field) output signals (e.g., a near-field mono-signal), which is then further processed for transmission to the far-end. These operations may lead to a reduction in far-field speech quality, but reduce echo-to-near-end-speech ratio when there is a signal from the far-end and thus a need for improved double-talk performance.

When the acoustic echo stops, i.e., is no longer detected above the threshold, the previously saved dereverberation states are reloaded, and processing to produce the one or more output signals reverts back to the far-field path and adaptive dereverberation.

Conceptually, this can be seen as having one set of integrated microphones for good speech pickup but with poor double-talk performance, another set of microphones with better double-talk performance but compromised speech pickup quality, and switching between the two sets of microphones as necessary. It may be that the reduction in speech quality when using the near-field path will not be subjectively bothersome since it mainly happens during double-talk. Even if it is noticeable, it would likely be preferred over problems associated with double-talk.

The embodiments presented herein implement a control and mixing mechanism that can automatically control various array processing modules, and select/mix the outputs of these array processing modules during a call, to achieve a balance between two conflicting array processing performance measures, i.e. far-field speech pickup and AEC full-duplex operation. The embodiments balance far-field speech pickup quality and double-talk performance in system designs having close coupling between loudspeakers and microphones. The pickup system for near-field acoustic echo suppression can also be implemented in a system having a single (or a few) microphones mounted further away from the echo sources (for instance below a large display in an integrated videoconference endpoint) and switching to those in situations with high echo levels. Another alternative is for the near-field suppressing system to be directive by physical design, or having fixed directivity by array processing of a few microphone elements.

Embodiments presented herein advantageously form two groups of fixed beams made from a single or multiple microphones. The beams in the first group are optimized for far-field speech pickup. The beams in the second group are optimized for cancellation of echo sources, often in the near field. The latter can be done because the position of loudspeakers relative to the microphones is known in integrated systems. The embodiments switch to one or a combination of near-end optimized beams, to avoid additional loss-insertion to a largest possible extent, thereby keeping double-talk performance optimized. This switch is normally done only during periods of echo/double talk challenges. Otherwise the embodiments switch to one or a combination of the far-field speech pickup beams. The embodiments apply comfort noise generated from the far-field beams to the near-field beams to keep the noise floor characteristics similar during the switching. The embodiments may be generalized to work with system setups where the geometrical relationships between loudspeakers and microphones are not known, by incorporating a calibration procedure. With no near-end sound sources active, the system can generate sound on loudspeakers and optimize the near-field beams automatically to minimize echo. Near-field beam settings may need to be further refined during run-time with near-end sound sources active to ensure far-field pickup is still acceptable.

In summary, in one form, a method is provided comprising: at an endpoint device including a loudspeaker and one or more microphones: driving the loudspeaker with a loudspeaker signal; converting sound to one or more microphone signals with the one or more microphones; concurrently transforming the one or more microphone signals into far-field beam signals representative of far-field beams and near-field beam signals representative of near-field beams; concurrently detecting and canceling echo in the far-field beam signals and in the near-field beam signals based on the loudspeaker signal to produce one or more far-field output signals and one or more near-field output signals, respectively; determining whether the echo is detected above a threshold; when the echo is not detected above the threshold, outputting the one or more far-field output signals; when the echo is detected above the threshold, outputting the one or more near-field output signals; and causing a signal based on the one or more output signals to be transmitted.

In summary, in another form, an apparatus is provided comprising: a loudspeaker to generate sound responsive to a loudspeaker signal; one or more microphones to convert sound to one or more microphone signals; a network interface unit to communicate with a network; and a processor coupled to the loudspeaker, the one or more microphones, and the network interface unit, wherein the processor is configured to: concurrently transform the one or more microphone signals into far-field beam signals representative of far-field beams and near-field beam signals representative of near-field beams; concurrently detect and cancel echo in the far-field beam signals and in the near-field beam signals based on the loudspeaker signal to produce one or more far-field output signals and one or more near-field output signals, respectively; determine whether the echo is detected above a threshold; when the echo is not detected above the threshold, output the one or more far-field output signals; when the echo is detected above the threshold, output the one or more near-field output signals; and cause a signal based on the one or more output signals to be transmitted.

In summary, in yet another form, a non-transitory processor readable medium is provided to store instructions that, when executed by a processor of an endpoint device including a loudspeaker and one or more microphones, cause the processor to: receive a loudspeaker signal used to drive the loudspeaker; receive one or more microphone signals from the one or more microphones that converted sound into the one or more microphone sound signals; concurrently transform the one or more microphone signals into far-field beam signals representative of far-field beams and near-field beam signals representative of near-field beams; concurrently detect and cancel echo in the far-field beam signals and in the near-field beam signals based on the loudspeaker signal to produce one or more far-field output signals and one or more near-field output signals, respectively; determine whether the echo is detected above a threshold; when the echo is not detected above the threshold, output the one or more far-field output signals; when the echo is detected above the threshold, output the one or more near-field output signals; and cause a signal based on the one or more output signals to be transmitted.

The above description is intended by way of example only. Various modifications and structural changes may be made therein without departing from the scope of the concepts described herein and within the scope and range of equivalents of the claims.

What is claimed is:

1. A method comprising:
   at an endpoint device including one or more microphones:
   converting sound to one or more microphone signals with the one or more microphones;
   transforming the one or more microphone signals into far-field beam signals representative of far-field beams and near-field beam signals representative of near-field beams;
   deriving a far-field noise level estimate from the far-field beam signals;
   synthesizing far-field comfort noise based on the far-field noise level estimate, and applying the far-field comfort noise to the far-field beam signals to produce far-field output signals;
   canceling echo in the near-field beam signals;
   performing near-field non-linear processing (NLP) on the near-field beam signals to reduce residual echo in the near-field beam signals;
   generating a near-field NLP gain based on the near-field NLP;
   synthesizing near-field comfort noise based on both the far-field noise level estimate and the near-field NLP gain so that the near-field comfort noise is similar to the far-field comfort noise, and applying the near-field comfort noise to the near-field beam signals to produce near-field output signals;
   selecting either the near-field output signals or the far-field output signals as output signals based on a selection criterion; and
   transmitting a signal that is based on the output signals.

2. The method of claim 1, further comprising:
   canceling echo in the far-field beam signals, wherein the selecting includes:

determining whether the echo in the near-field beam signals or the echo in the far-field beam signals is above a threshold;
when the echo in the near-field beam signals or the echo in the far-field beam signals is above the threshold, selecting the near-field output signals; and
when neither the echo in the near-field beam signals nor the echo in the far-field beam signals is above the threshold, selecting the far-field output signals as the output signals.

3. The method of claim 2, wherein the endpoint device includes a loudspeaker, and the method further comprises:
driving the loudspeaker with a loudspeaker signal; and
performing the canceling the echo in the far-field beam signals and the canceling the echo in the near-field beam signals using the loudspeaker signal.

4. The method of claim 1, further comprising:
removing noise from the far-field beam signals based on the far-field noise level estimate.

5. The method of claim 4, further comprising:
removing noise from the near-field beam signals.

6. The method of claim 1,
wherein the selection criterion includes a signal-to-noise ratio.

7. The method of claim 1, further comprising:
canceling echo in the far-field beam signals; and
performing far-field NLP on the far-field beam signals to reduce residual echo in the far-field beam signals, and generating a far-field NLP gain based on the far-field NLP, wherein the synthesizing the far-field comfort noise includes synthesizing the far-field comfort noise based on both the far-field noise level estimate and the far-field NLP gain.

8. The method of claim 1, further comprising:
dereverberating the far-field beam signals; and
dereverberating the near-field beam signals.

9. An apparatus comprising:
one or more microphones to convert sound to one or more microphone signals;
a network interface unit to communicate with a network; and
a processor coupled to the one or more microphones and the network interface unit, wherein the processor is configured to perform:
transforming the one or more microphone signals into far-field beam signals representative of far-field beams and near-field beam signals representative of near-field beams;
deriving a far-field noise level estimate from the far-field beam signals;
synthesizing far-field comfort noise based on the far-field noise level estimate, and applying the far-field comfort noise to the far-field beam signals to produce far-field output signals;
canceling echo in the near-field beam signals;
performing near-field non-linear processing (NLP) on the near-field beam signals to reduce residual echo in the near-field beam signals;
generating a near-field NLP gain based on the near-field NLP;
synthesizing near-field comfort noise based on both the far-field noise level estimate and the near-field NLP gain so that the near-field comfort noise is similar to the far-field comfort noise, and applying the near-field comfort noise to the near-field beam signals to produce near-field output signals;
selecting either the near-field output signals or the far-field output signals as output signals based on a selection criterion; and
transmitting a signal that is based on the output signals.

10. The apparatus of claim 9, wherein the processor is further configured to perform:
canceling echo in the far-field beam signals, wherein the processor is configured to perform the selecting by:
determining whether the echo in the near-field beam signals or the echo in the far-field beam signals is above a threshold;
when the echo in the near-field beam signals or the echo in the far-field beam signals is above the threshold, selecting the near-field output signals; and
when neither the echo in the near-field beam signals nor the echo in the far-field beam signals is above the threshold, selecting the far-field output signals as the output signals.

11. The apparatus of claim 10, further comprising a loudspeaker, wherein the processor is further configured to perform:
driving the loudspeaker with a loudspeaker signal,
wherein the processor is configured to perform the canceling the echo in the far-field beam signals and the canceling the echo in the near-field beam signals using the loudspeaker signal.

12. The apparatus of claim 9, wherein the processor is further configured to perform:
removing noise from the far-field beam signals based on the far-field noise level estimate.

13. The apparatus of claim 12, wherein the processor is further configured to perform:
removing noise from the near-field beam signals.

14. The apparatus of claim 9, wherein the selection criterion includes a signal-to-noise ratio.

15. The apparatus of claim 9, wherein the processor is further configured to perform:
canceling echo in the far-field beam signals; and
performing far-field NLP on the far-field beam signals to reduce residual echo in the far-field beam signals, and generating a far-field NLP gain based on the far-field NLP, wherein the processor is configured to perform the synthesizing the far-field comfort noise based on both the far-field noise level estimate and the far-field NLP gain.

16. The apparatus of claim 9, wherein the processor is further configured to perform:
dereverberating the far-field beam signals; and
dereverberating the near-field beam signals.

17. A non-transitory processor readable medium storing instructions that, when executed by a processor of an endpoint device including one or more microphones, causes the processor to perform:
converting sound to one or more microphone signals with the one or more microphones;
transforming the one or more microphone signals into far-field beam signals representative of far-field beams and near-field beam signals representative of near-field beams;
deriving a far-field noise level estimate from the far-field beam signals;
canceling echo in the far-field beam signals;
performing far-field non-linear processing (NLP) on the far-field beam signals to reduce residual echo in the far-field beam signals;
generating a far-field NLP gain based on the far-field NLP;

synthesizing far-field comfort noise based on both the far-field noise level estimate and the far-field NLP gain, and applying the far-field comfort noise to the far-field beam signals to produce far-field output signals;

synthesizing near-field comfort noise from the far-field noise level estimate so that the near-field comfort noise is similar to the far-field comfort noise, and applying the near-field comfort noise to the near-field beam signals to produce near-field output signals;

selecting either the near-field output signals or the far-field output signals as output signals based on a selection criterion; and transmitting a signal that is based on the output signals.

18. The non-transitory processor readable medium of claim 17, further comprising instructions to cause the processor to perform:

canceling echo in the near-field beam signals, wherein the selecting includes:

determining whether the echo in the near-field beam signals or the echo in the far-field beam signals is above a threshold;

when the echo in the near-field beam signals or the echo in the far-field beam signals is above the threshold, selecting the near-field output signals; and when neither the echo in the near-field beam signals nor the echo in the far-field beam signals is above the threshold, selecting the far-field output signals as the output signals.

19. The non-transitory processor readable medium of claim 17, further comprising instructions to cause the processor to perform:

canceling echo in the near-field beam signals; and performing NLP on the near-field beam signals to reduce residual echo in the near-field beam signals, and generating a near-field NLP gain based on the near-field NLP, wherein the instructions to cause the processor to perform the synthesizing the near-field comfort noise include instructions to cause the processor to perform synthesizing the near-field comfort noise based on both the far-field noise level estimate from the far-field beam signals and the near-field NLP.

20. The non-transitory processor readable medium of claim 17, wherein the selection criterion includes a signal-to-noise ratio.

\* \* \* \* \*